(12) United States Patent
Mase et al.

(10) Patent No.: US 9,186,775 B2
(45) Date of Patent: Nov. 17, 2015

(54) METHOD FOR PRODUCING ELASTIC GRINDING MATERIAL, ELASTIC GRINDING MATERIAL, AND BLASTING METHOD USING SAID ELASTIC GRINDING MATERIAL

(71) Applicant: FUJI MANUFACTURING CO., LTD., Tokyo (JP)

(72) Inventors: Keiji Mase, Tokyo (JP); Shozo Ishibashi, Tokyo (JP)

(73) Assignee: FUJI MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 14/364,858

(22) PCT Filed: Dec. 12, 2012

(86) PCT No.: PCT/JP2012/082192
§ 371 (c)(1),
(2) Date: Jun. 12, 2014

(87) PCT Pub. No.: WO2013/094492
PCT Pub. Date: Jun. 27, 2013

(65) Prior Publication Data
US 2014/0329441 A1      Nov. 6, 2014

(30) Foreign Application Priority Data

Dec. 21, 2011  (JP) .................................. 2011-279795

(51) Int. Cl.
*B24C 1/08* (2006.01)
*C09K 3/14* (2006.01)
*B24C 11/00* (2006.01)

(52) U.S. Cl.
CPC . *B24C 11/00* (2013.01); *B24C 1/08* (2013.01); *C09K 3/1409* (2013.01); *C09K 3/1436* (2013.01)

(58) Field of Classification Search
CPC ............ B24C 1/08; B24C 1/00; B24C 11/00; C09K 3/1436

USPC ........ 451/330, 39, 38; 51/297, 298, 295, 293; 134/6, 7
See application file for complete search history.

(56) References Cited

U.S. PATENT DOCUMENTS

| 2,426,072 | A | * | 8/1947 | Wall et al. ....................... 451/39 |
| 3,696,565 | A | * | 10/1972 | Claeys ............................. 451/39 |
| 5,573,560 | A | * | 11/1996 | Kobayashi et al. ............. 51/293 |

(Continued)

FOREIGN PATENT DOCUMENTS

| JP | S55-98565 | 12/1953 |
| JP | 09-314468 | 12/1997 |

(Continued)

OTHER PUBLICATIONS

"New Application of Sandblasting Technology" pp. 32,33 of Material Test Technology vol. 51, No. 4, Oct. 2006.
International Search Report dated Jan. 15, 2013.

*Primary Examiner* — Robert Rose
(74) *Attorney, Agent, or Firm* — Cooper Legal Group LLC

(57) ABSTRACT

A long-lasting elastic grinding material capable of subjecting surfaces of objects to mirror-finishing, glossifying and the like via blasting thereof. A nucleus (2) is obtained by granulating a crosslinked polyrotaxane compound having self-tackiness and a rubber hardness of 30 or less into particles of a prescribed diameter. The nucleus (2), which is soft and exhibits significant deformability, is sealed on the inside of an abrasive-particle layer (3) by: adhering abrasive particles (31) to the surface of the nucleus (2): then affixing the abrasive particles (31) to the surface of the nucleus (2) by applying pressure to the surface of the nucleus (2) to which the abrasive particles (31) are adhered; and forming the abrasive-particle layer (3), which has a masonry-like structure formed by attaching a plurality of the abrasive particles (31) in the thickness direction to the surface of the nucleus (2), by further subjecting the surface of the nucleus (2) to which the abrasive particles (31) are affixed to repeated adhesion of identical abrasive particles (31) and affixing by application of pressure.

19 Claims, 8 Drawing Sheets

(56) References Cited

U.S. PATENT DOCUMENTS

| | | | |
|---|---|---|---|
| 6,146,247 A * | 11/2000 | Nokubi et al. | 451/40 |
| 6,726,536 B1 * | 4/2004 | Drake et al. | 451/39 |
| 7,144,303 B2 * | 12/2006 | Kamimura et al. | 451/38 |
| 7,214,126 B1 * | 5/2007 | Kamei | 451/541 |
| 8,870,985 B2 * | 10/2014 | Wang et al. | 51/307 |
| 2003/0138398 A1 | 7/2003 | Okumura et al. | |
| 2011/0005142 A1 * | 1/2011 | Mase et al. | 51/298 |

FOREIGN PATENT DOCUMENTS

| | | |
|---|---|---|
| JP | 2001-207160 | 7/2001 |
| JP | 2009-215327 | 9/2009 |

* cited by examiner (A) SPRINKLE ABRASIVE GRAINS (B) PRESS AND FIX
PROTRUSION (C) SPRINKLE ABRASIVE GRAINS AGAIN (D) PRESS AND FIX
PROTRUSION (A) ×80

(B) ×2000

GRAPH OF CORRELATION BETWEEN PROCESSING TIME
AND SURFACE ROUGHNESS    [SAMPLE 1 (SUS 304)]

GRAPH OF CORRELATION BETWEEN PROCESSING TIME AND SURFACE ROUGHNESS [SAMPLE 2 (WC)]

METHOD FOR PRODUCING ELASTIC GRINDING MATERIAL, ELASTIC GRINDING MATERIAL, AND BLASTING METHOD USING SAID ELASTIC GRINDING MATERIAL

FIELD OF THE INVENTION

The present invention relates to a method for manufacturing an elastic abrasive and to the elastic abrasive. More specifically, the present invention relates to a method for manufacturing an elastic abrasive with which a glossy finish, a luster-like finish, a mirror-like finish, a smooth finish, etc. of a surface of a workpiece can be achieved by propelling the elastic abrasive onto the surface of the workpiece by means of a blasting machine, as well as to the elastic abrasive manufactured by the method.

In this specification, "blasting" includes not only blasting methods in which a compressed fluid such as compressed air is utilized in propelling (ejecting) an abrasive, such as dry blasting and wet blasting, but also a wide variety of blasting methods in which it is possible to propel an abrasive at a predetermined ejection speed and ejection angle onto the surface of a workpiece, such as a centrifugal (impeller) method in which an abrasive is propelled by rotating an impeller to impart a centrifugal force to the abrasive and a stamping method in which an abrasive is propelled by throwing the abrasive by means of a stamping rotor.

DESCRIPTION OF THE RELATED ARTS

As polishing treatment for improving the surface roughness of the surface of a workpiece to achieve a mirror-like finish, a glossy finish, etc. of the surface, generally, polishing by means of abrasive paper or abrasive cloth, polishing by means of a buff, lapping, polishing by way of contact with rotating abrasive grains, polishing by way of contact with abrasive grains that are ultrasonically made to vibrate, etc. are used: on the other hand, blasting is not used.

The reason that blasting is not used for polishing treatment such as a mirror-like finish or a glossy finish as described above is that since an abrasive is propelled onto a workpiece to make the abrasive collide with the surface of the workpiece in the blasting, satin-like irregularities (concavity and convexity) are formed on the surface when the abrasive is made to collide with the workpiece surface as described above.

In order to suppress the formation of such satin-like irregularities while precisely cutting or otherwise treating the surface of the workpiece, it is also conceivable to perform blasting by using fine abrasive grains of about size #3000 (4 μm).

However, if it is attempted to directly propel such fine abrasive grains, since the mass of the individual abrasive grains is small, the abrasive grains float in air in an ejection chamber formed in a cabinet of a blast machine, interfering with the vision and hindering monitoring of the treated region, which prohibits precise treatment.

Furthermore, in the case where such fine abrasive grains are used, if the abrasive grains become charged with static electricity, the abrasive grains become contacted to the inner surface of the cabinet and to the workpiece in large quantities. In order to remove the contacted abrasive grains, it is necessary to feed ionized air or to perform wet cleaning. This requires providing a device configured for this purpose in the blast machine. Furthermore, blasting is interrupted during the removal work, which reduces the work efficiency.

Accordingly, there is a demand for the development of an abrasive that allows treatment similar to the above-described treatment using fine abrasive grains while preventing the abrasive grains from floating in an ejection chamber and suppressing the contact of the abrasive grains to the inner surface of a cabinet or a workpiece due to static electricity.

As described above, usually, it is not possible to achieve a glossy finish such as a mirror-like finish of the surface of a workpiece by way of blasting. However, there was proposed abrasives in which abrasive grains are carried on the surface of cores constituted of elastic bodies or abrasives in which elastic bodies and abrasive grains are integrally formed as abrasives for blasting that allow polishing of the surface of a workpiece while suppressing the formation of a satin-like finish on the surface of the workpiece.

Among these abrasives, as abrasives in which abrasive grains are carried on the surface of cores, an abrasive in which abrasive grains are contacted to cores constituted of elastic and porous plant fibers by using fat or sugar contained in the plant fibers as an adhesive (see Patent Document 1) and an abrasive in which abrasive grains are contacted to the surface of cores containing water, constituted of gelatin, etc., and thus having desired elasticity and adhesiveness, by utilizing the adhesiveness (see Patent Document 2) have been proposed.

Furthermore, as abrasives in which elastic bodies and abrasive grains are integrally formed, a granulated abrasive in which multiple abrasive grains are integrally formed by using an elastic material having a greater coefficient of restitution than the abrasive grains as a binder, such as rubber or an acrylic resin (see Patent Document 3), and a gel abrasive in which abrasive grains are dispersed in a crosslinked polyrotaxane constituting elastic bodies by chemically bonding the cyclic molecules of a polyrotaxane with each other in a mixture of the abrasive grains and the polyrotaxane and by granulating the resulting crosslinked polyrotaxane compound to have a predetermined grain diameter (see Patent Document 4) have been proposed.

DOCUMENTS OF RELATED ART

Patent Documents

Patent Document 1: Japanese Patent No. 2,957.492
Patent Document 2: Japanese Unexamined Patent Application Publication No. 2001-207160
Patent Document 3: Japanese Utility Model KOKAI (LOPI) No. S55-98565
Patent Document 4: Japanese Unexamined Patent Application Publication No. 2009-215327

DISCLOSURE OF THE INVENTION

Problem to be Solved by the Invention

As described above as related art, with the abrasives in which abrasive grains are contacted to the surface of elastic cores and the abrasives in which elastic bodies and abrasive grains are integrally formed (these abrasives will hereinafter be referred to collectively as "elastic abrasives"), owing to plastic deformation of the cores or the elastic bodies, even when the abrasive collides with a workpiece, the impact is absorbed so that indentations are hardly formed on the surface of the workpiece. Thus, the elastic abrasives exhibit a superior effect in that treatment such as mirror-surface polishing can also be performed by way of blasting in which the abrasives are made to slide on the surface of a workpiece while preventing a satin-like finish of the surface of the workpiece.

However, the known elastic abrasives described above have the following problems.

Problems with the Elastic Abrasives in which Abrasive Grains are Carried on the Surface (Patent Documents 1 and 2)

Of the elastic abrasives described above, in the elastic abrasives configured by attaching abrasive grains to the surface of cores, the abrasive grains are contacted to the surface of the cores by utilizing the adhesiveness of the fat or sugar contained in the cores or the adhesiveness that arises when the cores are impregnated with water. Thus, with such an elastic abrasive, when the elastic abrasive is propelled towards and is made to collide with the surface of a workpiece, the fat and oil or moisture in the cores becomes lost due to the impact of the collision or the occurrence of frictional heat, so that the cores lose their adhesiveness, and the abrasive grains carried on the surface fall off.

Thus, with this type of abrasive, since the cutting ability becomes gradually lost as it is used repeatedly, it is necessary to replace the entire volume of the abrasive with a new one at regular intervals or to perform a restoration process such as replenishing the abrasive with fat and oil or moisture to restore adhesiveness and causing the abrasive grains to be carried or contacted again, which involves costs.

Furthermore, since the cutting ability of an abrasive becomes diminished and lost in a relatively short period, as described above, in the case where a large number of workpieces are treated sequentially while repeatedly using an abrasive, in order to finish workpieces that are treated earlier and later with uniform quality, it is necessary to change the treatment condition or process specification as time elapses in view of changes in the cutting ability of the abrasive over time. This makes it difficult to automate the process in the case where a large number of products are treated successively.

Furthermore, when the fat and oil or moisture becomes lost, the core becomes hardened, so that the abrasive becomes broken due to the impact of collision on the surface of the workpiece. This increases the consumption rate of the abrasive. Furthermore, once the abrasive has become hardened, it can no longer absorb the impact of collision. This results in the formation of a satin-like finish, etc. on the surface of the workpiece, thus failing to achieve a desired treatment condition.

Problems with the Abrasives in which Elastic Bodies and Abrasive Grains are Integrally Formed (Patent Documents 3 and 4)

As opposed to the abrasives configured by carrying abrasive grains on the surface of cores, as described above, with the abrasive in which abrasive grains are dispersed in a crosslinked polyrotaxane (Patent Document 4), since the crosslinked polyrotaxane used here is of the type that exhibits elasticity when impregnated with water, when the abrasive is used as an abrasive for blasting and is dehydrated, losing moisture, the elasticity becomes diminished and the abrasive eventually becomes hardened, resulting in a satin-like finish on the surface. That is, the same problems occur as with the above-described elastic abrasives described in Patent Documents 1 and 2.

On the other hand, with the elastic abrasive in which abrasive grains are integrally formed by using an elastic material such as rubber or an acrylic resin as a binder (Patent Document 3), as opposed to the elastic abrasives according to Patent Documents 1 and 2, problems such as changes in properties caused by drying, etc. do not occur.

However, with both the elastic abrasives described in Patent Documents 3 and 4, the cutting ability diminishes as the portions of the abrasive grains exposed to the surface (lips) become worn as a result of continuous usage. Thus, similarly to the case of using an abrasive in which abrasive grains are carried on the surface, it is necessary to replace the abrasive each time, after it is used for a certain period, which increases costs. Furthermore, automation is difficult since the treatment condition change from moment to moment as the abrasive becomes degraded over time.

Furthermore, in the case where elastic bodies are used as binders for integrally forming abrasive grains together in an abrasive in which the abrasive grains and the elastic bodies are integrally formed (Patent Document 3), since the content of the elastic body is small relative to the abrasive grains, which makes the properties of the abrasive grains dominant, in the case where such an abrasive is ejected onto the surface of a workpiece, there is still the problem of formation of a satin-like finish (e.g., see the description of the shortcomings of Patent Documnent 3 described as related art in paragraph [0003] of Patent Document 2).

On the other hand, with the elastic abrasive in which abrasive grains are dispersed in elastic bodies, by increasing the content of the elastic bodies, the properties of the elastic bodies are made to appear more strongly as the ratio of the elastic bodies increases (as the amount of abrasive grains added decreases). This improves the impact absorbing ability, which enhances the effect of preventing the formation of a satin-like finish, etc. on the surface of a workpiece.

However, as the ratio of the elastic bodies in the abrasive is increased, the ratio of abrasive grains exposed beyond the surface of the abrasive decreases. This lowers the basic cutting ability of the abrasive, resulting in a longer treatment period.

Furthermore, if the ratio of abrasive grains exposed beyond the surface of the abrasive is small, the exposed portions (lips) wear intensely. Thus, the cutting ability diminishes in a relatively short period, so that the life of the abrasive becomes shorter.

Combinations of the Above Related Arts

It is predictable that by using an elastomer product having autohesion properties as cores and carrying abrasive grains on the surface by utilizing the adhesiveness of the cores themselves, it will be possible to overcome the problem with the elastic abrasives described in Patent Documents 1 and 2, that is, detachment of abrasive grains from the surface due to loss of an adhesive component such as fat and oil or sugar, loss of moisture caused by drying, etc.

However, in the elastic abrasive configured as described above, the core exhibits adhesiveness not only with the abrasive grains but with any matter. Thus, as the elastic abrasive is used, cutting dust, detached burrs, etc. that occur during blasting become contacted to the surface of the elastic abrasive, causing changes in the cutting ability. Depending on the case, this may cause treatment defects, such as damaging the surface of a workpiece.

Furthermore, since the cores exhibit their adhesiveness with each other, abrasives become clamped with each other to form a large agglomerate. It is difficult even to just propel an elastic abrasive formed in this way.

In particular, in the case where an elastomer which is soft and highly deformable is used as cores in order to improve the ability to absorb impact at the time of collision, even if abrasive grains are contacted uniformly on the surface, due to their softness and deformability, the cores become exposed to the surface of the elastic abrasive from the gaps between the abrasive grains. This inevitably results in the contact of foreign matter and mutual agglomeration of the elastic abrasive as described earlier.

Thus, in the case where an elastic abrasive configured as described above is assumed, it is required to use an elastomer having a certain degree of hardness as the cores. Thus, there is still a limit to the impact absorbing ability that can be imparted to an elastic abrasive.

Moreover, an elastomer having autohesion properties generally exhibits stronger adhesiveness as it becomes softer and more deformable, and the adhesiveness diminishes as the hardness increases. Thus, when hardness is imparted to the elastomer constituting cores as described above, the autohesion properties diminish, so that the ability to maintain abrasive grains on the surface of the cores also diminishes. This inevitably results in the problem of performance degradation due to detachment of abrasive grains as a result of continuous usage.

Object of the Present Invention

Accordingly, the present invention has been made in order to overcome the shortcomings of the related art described above, and it is an object thereof to provide an elastic abrasive having conflicting properties: specifically, while maintaining the properties of existing elastic abrasives, such as the applicability to mirror-surface polishing by way of blasting, it becomes possible to impart a higher impact absorbing ability to such elastic abrasives; at the same time, it becomes possible to prevent mutual clamping and agglomeration of elastic abrasives, and the initial performance can be maintained without substantial performance degradation even after continuous usage over a long period.

Means for Solving the Problems

Means for solving the problems will be described below using reference numerals used in embodiments of the invention. It is to be noted that these reference numerals are only provided for clarifying the correspondence relationship between the scope of the claims and the embodiments of the invention, but should not be used for limiting the interpretation of the technical scope of the claims of the present invention.

In order to achieve the above objective, a method for manufacturing an elastic abrasive 1 according to the present invention comprises, preparing a core 2 by granulating a crosslinked polyrotaxane compound having a rubber hardness of 30 or less and having autohesion properties so as to have a predetermined grain diameter, and after sprinkling abrasive grains 31 having an average grain diameter of 0.1 μm to 12 μm on the surface of the core 2, applying a pressing force to the surface of the core 2 having the abrasive grains 31 sprinkled thereto to fix the abrasive grains 31 on the surface of the core 2, and forming an abrasive-grain layer 3 having a masonry structure formed by integrally forming multiple abrasive grains 31 in the thickness direction on the surface of the core 2 by repeating similar fixation by sprinkling abrasive grains 31 and applying a pressing force on the surface of the core 2 having the abrasive grains 31 fixed thereon.

Preferably, the core 2 has a compression set of 5% or less and vibration absorbing properties (tan δ) of 0.3 or more at 1 Hz to 100 kHz.

Preferably, the abrasive-grain layer 3 has a thickness W less than ¼ of the short diameter d of the elastic abrasive 1.

Preferably, the core 2 has a rubber hardness of 10 or less, and the core 2 has a compression set of 1% or less.

The elastic abrasive 1 can be manufactured by putting a mixture of the core 2 and the abrasive grains 31 into a drum of a mixer together with a mixing medium, and rotating the drum to repeatedly attach abrasive grains 31 to the surface of the core 2 and apply a pressing force to the core 2.

An elastic abrasive 1 according to the present invention can be manufactured by any of the above mentioned methods and the elastic abrasive 1 comprises a core 2 prepared by granulating a crosslinked polyrotaxane compound having a rubber hardness of 30 or less and having autohesion properties to have a predetermined grain diameter and an abrasive-grain layer 3 formed on the surface of the core 2, wherein the abrasive-grain layer 3 has a masonry structure formed by integrally forming multiple abrasive grains 31 having an average grain diameter of 0.1 μm to 12 μm by the crosslinked polyrotaxane compound in the thickness direction.

Preferably, in the elastic abrasive 1, the core 2 has a compression set of 5% or less, more preferably. 1% or less, and vibration absorbing properties (tan δ) of 0.3 or more at 1 Hz to 100 kHz.

Furthermore, preferably, the abrasive-grain layer 3 has a thickness W less than ¼ (25%) of a short diameter d of the elastic abrasive 1.

Preferably, the crosslinked polyrotaxane compound is formed by crosslinking a compound selected from polycarbonate diol and an acrylic acid ester copolymer with a polyrotaxane by using a crosslinking agent composed of an isocyanate compound.

Preferably, the polyrotaxane is be formed by penetrating the openings of α-cyclodextrin molecules with polyethylene glycol and bonding adamantane groups at either end of the polyethylene glycol, and polycaprolactone groups may be substituted for a part of the hydroxyl groups of the α-cyclodextrin molecules.

A silane coupling agent may be mixed with the crosslinked polyrotaxane compound.

The elastic abrasive 1 according to the present invention may be used to blasting in which the elastic abrasive 1 is ejected at an incident angle of 0 to 90° onto a surface of a workpiece together with a compressed fluid. Preferably, the incident angle is 5 to 70°, more preferably, 10 to 60° and further preferably 10 to 45 °.

Preferably, the elastic abrasive 1 according to the present invention is ejected at an ejection pressure within a range of 0.01 to 0.5 MPa, more preferably within a range of 0.02 to 0.3 MPa.

Effects of the Invention

Owing to the above-described configuration according to the present invention, the following prominent effects were achieved with the elastic abrasive 1 according to the present invention.

By using the core 2 formed of a crosslinked polyrotaxane compound having softness with a rubber hardness of 30 or less and having autohesion properties, adhesiveness was exhibited without being affected by the moisture content in the core 2, etc., which prevented detachment of abrasive grains, etc. due to drying, etc. during usage. Furthermore, the abrasive-grain layer 3 formed on the surface of the core, having a masonry structure formed by integrally forming multiple abrasive grains 31 in the thickness direction, had an effect of containing the core 2 within the abrasive-grain layer 3 during usage and storage as well as imparting a cutting ability to the elastic abrasive 1. Accordingly, even though a crosslinked polyrotaxane compound that was soft and highly deformable and that had autohesion properties was used as the core 2, the occurrence of problems such as the contact of foreign matter on the surface of the elastic abrasive 1 and mutual clamping and agglomeration of the elastic abrasive 1 was reliably prevented.

Furthermore, with the elastic abrasive 1 according to the present invention, in addition to preventing detachment of the abrasive grains 31 due to drying, etc. as described above, since the abrasive-grain layer 3 had a masonry structure formed by integrally forming multiple abrasive grains 31, even if all the abrasive grains 31 on an uppermost surface layer among the abrasive grains 31 constituting the abrasive-grain layer 3 were lost, this did not immediately result in the loss of the cutting ability. Thus, a certain level of cutting ability was exhibited over a relatively long period.

Furthermore, with the elastic abrasive 1 according to the present invention, owing to the above configuration, even in the case where the thickness of the abrasive-grain layer 3 had decreased due to wear during usage, by repeating the work of sprinkling abrasive grains on the surface of the elastic abrasive 1 after it was used and pressing and fixing the abrasives, it was possible to grow the abrasive-grain layer 3 with relative ease to restore the elastic abrasive 1.

By using a crosslinked polyrotaxane compound having a compression set of 5% or less and vibration absorbing properties (tan δ) of 0.3 or more at 1 Hz to 100 kHz as the crosslinked polyrotaxane compound described above, the elastic abrasive exhibited an extremely high ability to absorb impact at the time of collision, exhibited little setting, and was hardly broken. The prepared elastic abrasive had a life that was at least ten or more times longer compared with existing elastic abrasives.

Although the elasticity of the elastic abrasive 1 was lost as the thickness of the abrasive-grain layer 3 was increased, it was possible to maintain relatively high elasticity by making the thickness of the abrasive-grain layer 3 less than ¼ (25%) of the short diameter d of the elastic abrasive 1.

With the configuration in which the rubber hardness of the core 2 was 10 or less, the impact absorbing ability of the elastic abrasive 1 was further improved, and mutual clamping and agglomeration of the elastic abrasive 1 were prevented even though the extremely soft core 2 was used.

Furthermore, with the configuration in which the compression set of the core 2 was 1% or less, the setting resistance of the elastic abrasive 1 was further improved, so that the life of the elastic abrasive 1 was further extended.

The elastic abrasive described above was manufactured with relative ease by repeatedly applying impacts to a mixture of the core 2 and the abrasive grains 31 described above, for example by putting a mixture of the core 2 and the abrasive grains 31 into a drum of a mixer together with mixing media such as ceramic balls or steel balls and by rotating the drum.

Regarding the crosslinked polyrotaxane compound used for the core 2 by using a crosslinked polyrotaxane compound prepared by crosslinking a compound selected from polycarbonate diol and an acrylic acid ester copolymer with a polyrotaxane via a crosslinking agent composed of an isocyanate compound, autohesion properties and a rubber hardness of 30 or less were achieved.

Furthermore, regarding the polyrotaxane used in the crosslinked polyrotaxane compound, by using a polyrotaxane prepared by penetrating the openings of α-cyclodextrin molecules with polyethylene glycol and bonding adamantane groups at either end of the polyethylene glycol, the value of rubber hardness was further decreased.

Furthermore, by adding a silane coupling agent to the crosslinked polyrotaxane compound, the adhesion with the abrasive grains composed of an inorganic material was improved.

Furthermore, when the elastic abrasive 1 according to the present invention was ejected together with a compressed fluid at an incident angle of 0 to 90° onto the surface of a workpiece, since the core 2 of the elastic abrasive 1 according to the present invention hardly bounced back due to its high deformability and low rubber hardness (elastic modulus), due to the remaining energy of ejection of the elastic abrasive 1 in the surface direction and the compressed fluid that had changed its flow direction after colliding with the workpiece into the direction along the surface of the workpiece, the elastic abrasive 1 slid along the surface of the workpiece to polish the surface of the workpiece.

Furthermore, the elastic abrasive 1 was flattened considerably by collision, so that the contact area with the surface, i.e., the polishing area, became larger, and the surface was polished along the surface. Furthermore, the impact of collision with the surface of the workpiece was distributed by pulley-like operation of the crosslinked cyclic molecules of the polyrotaxane in the core 2, and the distributed uniform force was applied to the individual abrasive grains 31 of the elastic abrasive 1. Thus, mirror-surface polishing was performed such that the surface became highly smooth and uniform.

Furthermore, in the interior of the core 2 of the elastic abrasive 1 that had been flattened after colliding with the surface of the workpiece, in addition to what is called rubber elasticity, with which extended linear molecules restored their original rounded and shrunken shapes, a resilient force of the contracted cyclic molecules trying to restore their original shapes also acted. Accordingly, although the elastic abrasive 1 according to the present invention had a low elastic modulus, the elastic abrasive 1 exhibited superior restoration performance compared with ordinary rubber.

Furthermore, when the ejection pressure of the elastic abrasive 1 was in a range of 0.01 to 0.5 MPa, while ensuring the energy of collision with the workpiece, detachment of the abrasive grains 31 from the abrasive-grain layer 3 of the elastic abrasive 1 was prevented when the elastic abrasive 1 collided with the workpiece, so that the life of the elastic abrasive 1 was extended.

BEST MODE FOR CARRYING OUT THE INVENTION

Embodiments according to the present invention will now be described with reference to the attached drawings.

1. Overall Structure of the Abrasive

Figure 1:
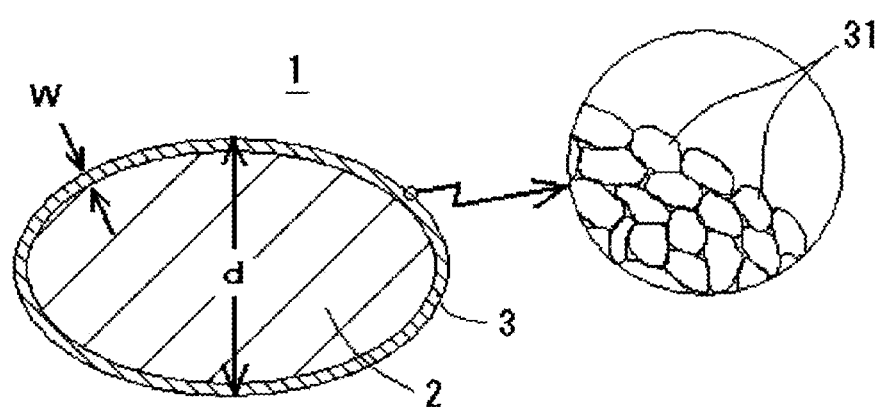
FIG. 1 shows a schematic sectional view of an elastic abrasive according to the present invention.

An elastic abrasive 1 according to the present invention has a structure in which, on the surface of each core 2 composed of a crosslinked polyrotaxane compound having softness with a rubber hardness of 30 or less and having autohesion properties, an abrasive-grain layer 3 having a masonry structure formed by integrally forming multiple abrasive grains 31 in the thickness direction is provided (see FIG. 1).

2. Raw Materials

(1) Abrasive Grains

As the abrasive grains 31 used in the elastic abrasive 1 described above, any kind of abrasive grains 31 having a cutting ability, a polishing ability, and a lustering ability may be used. For example, various known kinds of abrasive grains 31 may be used, such as diamond, boron carbide ($B_4C$), silicon carbide, alumina, tungsten carbide, zirconia, zircon, garnet, quartz, glass, iron chromium boron steel, cast steel, tungsten, nylon, and polycarbonate. One of these materials alone or a mixture of two or more of these materials may be used.

In the case where a mixture of two or more kinds of abrasive grains 31 is used, preferably, one of the kinds should be chosen as the main abrasive grains for the purpose of surface treatment, and the mixture should be compounded such that this kind of abrasive grains is contained at a ratio of 50 mass % or more.

For example, in the case where the workpiece is composed of cemented carbide, efficient treatment becomes possible by choosing hard abrasive grains made of diamond, silicon carbide, etc. as the main abrasive grains, and it becomes possible to achieve a desired surface economically by using boron carbide, silicon carbide, alumnina, etc. as the secondary abrasive grains.

The size of the abrasive grains 31 may be chosen appropriately from an average grain diameter range of 0.1 to 12 μm. In the case where treatment such as mirror-surface treatment for lustering the surface of the workpiece is to be performed, preferably, fine abrasive grains of 6 μm (#2000 or finer) or less should be used. In the elastic abrasive according to the present invention, it is even possible to use fine abrasive grains with an average grain diameter of 1 μm or less (#8000 or finer).

(2) Cores

As the cores 2 described earlier, a crosslinked polyrotaxane compound having softness with a rubber hardness of 30 or less and having autohesion properties, granulated to have a predetermined grain diameter is used. Preferably, a crosslinked polyrotaxane compound having a compression set of 5% or less and vibration absorbing properties (tan δ) of 0.3 or more at 1 Hz to 100 kHz is used.

Here, a "polyrotaxane" which is the main component of the crosslinked polyrotaxane compound has a structure in which blocking groups are bonded at either end of each linear molecule penetrating through the holes of multiple cyclic molecules such that the linear molecule cannot be extracted from the cyclic molecules. Linear molecules are inserted through the holes of cyclic molecules to prepare a "pseudo-polyrotaxane" (not having blocking groups), and blocking groups are bonded at either end of each linear molecule of the pseudo-polyrotaxane to prepare a "blocked polyrotaxane" in which the linear molecule cannot be extracted from the cyclic molecules. Furthermore, with additives added as needed to the resulting blocked polyrotaxane, the cyclic molecules of the blocked polyrotaxane are chemically bonded so as to be crosslinked with each other, whereby a crosslinked polyrotaxane compound constituting an elastic body can be prepared. The cores 2 that are used in the elastic abrasive according to the present invention can be prepared by granulating this crosslinked polyrotaxane compound to have a predetermined grain diameter.

Examples of the linear molecules described above include polyethylene glycol, polypropylene glycol, polybutadiene, polytetrahydrofuran, polyacrylic acid ester, polydimethylsiloxane, polyethylene, polypropylene, polyisoprene, polyisobutylene, etc.

The cyclic molecules described above are penetrated through their holes by the linear molecules described above. Examples include cyclic polymers such as cyclic polyethers, cyclic polyesters, cyclic polyether amines, and cyclic polyamines, cyclodextrins such as α-cyclodextrin, β-cyclodextrin, and γ-cyclodextrin, etc. Furthermore, as the cyclic molecules described above, cyclic molecules that can move on the penetrating linear molecules and that have reactive groups allowing chemical bonding with a crosslinking agent are preferable. Examples include cyclodextrins such as α-cyclodextrin, β-cyclodextrin, and γ-cyclodextrin.

Furthermore, in the case where a cyclodextrin is used as the cyclic molecules described above, in order to improve compatibility with other materials such as the additives and crosslinking agent described above, solubility, reactivity, and dispersibility in the solvent, etc., substituent groups may be substituted for the hydroxyl groups of the cyclodextrin. Examples of preferred substituent groups include acetyl groups, alkyl groups, trityl groups, tosyl groups, trimethylsilyl groups, phenyl groups, hydroxypropyl groups, polycaprolactone groups, alkoxysilane, etc., and polyester chains, oxyethylene chains, alkyl chains, acrylic acid ester chains, etc.

As the blocking groups described earlier, bulky groups, ionic groups, etc. may be used in order to prevent extraction of the linear molecules from the cyclic molecules. Specific examples include dinitrophenyl groups, cyclodextrins, adamantane groups, trityl groups, fluoresceins, pyrenes, anthracenes, etc.

The cyclic molecules of the blocked polyrotaxane described above can be crosslinked with each other by chemically bonding them via a crosslinking agent. The crosslinking agent that is used should preferably have two or more reactive groups in order to crosslink at least two polyrotaxane molecules. Furthermore, the crosslinking agent is chosen in consideration of compatibility with other materials. Examples of the crosslinking agent include polyethers, polyesters, polysiloxanes, polycarbonates, poly(meth)acrylates, polyenes, copolymers of these materials, and mixtures of these materials. More specific examples include polyethers such as polyethylene glycol diol, dicarboxylic-acid-terminated polyethylene glycol, dithiolic-acid-terminated polyethylene glycol, polypropylene diol polytetrahydrofuran, bis(3-aminopropyl)-terminated poly(tetrahydrofuran), polypropylene glycol bis(2-aminopropyl ether), glycerol propoxylate, glycerol tris [amino-terminated poly(propylene glycol)], pentaerythritol ethoxylate, and pentaerythritol propoxylate: polyesters such as poly(ethylene adipate), diol-terminated poly(1,3-propylene adipate), diol-terminated poly(1,4-butylene adipate), and polylactone; polyenes such as modified polybutadiene and modified polyisoprene; siloxanes such as disilanol-terminated polydimethylsiloxane, hydride-terminated polydimethylsiloxane, bis(aminopropyl)-terminated polydimethylsiloxane, diglycidyl-ether-terminated polydimethylsiloxane, dicarbinol-terminated polydimethylsiloxane, divinyl-terminated polydimethylsiloxane, and dicarboxylic-acid-terminated polydimethylsiloxane; polyalkylene carbonate diols containing 1,5-pentanediol, 1,6-hexanediol, etc.; and isocyanate compounds such as xylylene diisocyanate, hexamethylene diisocyanate, tolylene diisocyanate, isophorone diisocyanate, and adducts of these materials (e.g., adducts of trimethylolpropane).

Furthermore, by crosslinking the cyclic molecules of the blocked polyrotaxane with each other by chemically bonding them with a compound having adhesion properties added as the additive described earlier, it is possible to prepare a crosslinked polyrotaxane compound having autohesion properties. The compound having adhesion properties may be bonded (crosslinked) directly with the cyclic molecules of the polyrotaxane, or the compound having adhesion properties may be bonded (crosslinked) indirectly with the cyclic molecules of the polyrotaxane via a crosslinking agent.

The compound having adhesion properties may be polycarbonate diol, an acrylic acid ester copolymer, etc.

The "granulation" for preparing the cores 2 described earlier includes not only the case where the resulting lump of crosslinked polyrotaxane compound is cut, crushed, or otherwise processed into indefinite shapes but also includes the case where the compound is cut or broken into predetermined shapes. The grain shapes of the cores 2 may have regularity, such as rectangular parallelepiped, cubic, or oblate shapes, or may be indefinite shapes formed by crushing the compound by means of a crushing machine, etc., and these shapes may even coexist. As other methods, for example, the cores 2 may be prepared directly by forming a predetermined shape at the time of crosslinking by poor-solvent dropwise addition, spraying, extrusion, mold-based shaping, etc. It is also possible to employ granulation means involving punching, etc.

Here, crosslinked polyrotaxane compounds generally have properties that their elastic modulus (rubber hardness) and compression set are both low and also have the property that they exhibit superior vibration absorption. Among such crosslinked polyrotaxane compounds, one having rubber hardness (JIS K 6253) of 30 or less, preferably 10 or less, and having autohesion properties is used as the cores 2 of the elastic abrasive according to the present invention.

Preferably, as the crosslinked polyrotaxane compound, one with a compression set (JIS K 6262) of 5% or less, more preferably 1% or less, and with vibration absorbing properties (tan δ) at 1 Hz to 100 kHz of 0.3 or more, more preferably 0.5 or more is used.

Here, as the elastic modulus of the elastic abrasive 1 becomes lower, the impact of a collision is absorbed better, which hinders the formation of a satin-like finish, etc. On the other hand, by forming the abrasive-grain layers 3 on the surface of the cores 2, the rubber hardness of the resulting elastic abrasive 1 becomes higher than the rubber hardness of the cores 2, and therefore, the lower the rubber hardness of the cores 2 is the better. As the cores 2, one with a rubber hardness of 30 or less, preferably 10 or less is used.

Furthermore, by making the compression set 5% or less, preferably 1% or less, which is extremely small, stress relaxation is low, so that the compressive stress that acts on the workpiece does not change even if the elastic abrasive 1 is repeatedly ejected and made to collide with the workpiece. Thus, even in the case where the elastic abrasive according to the present invention is used repeatedly, the treated condition of the workpiece can be maintained constant. Together with the formation of the abrasive-grain layers 3 having masonry structures which will be described later, this makes it possible to extend the life of the elastic abrasive.

Furthermore, the vibration absorbing properties are related to vibration and the amount of impact energy that can be absorbed by the cores 2. In the case where tan δ is 0.3 or less, when the elastic abrasive collides with the workpiece, the absorption amount of vibration and impact energy received by the cores is small, which hinders the formation of a mirror-surface finish of the workpiece surface.

The crosslinked polyrotaxane compound described above is an elastic body having a molecular weight 400000 or more and having a low coefficient of restitution, and it has the property that it is highly extendable (400% on a stress-strain curve).

3. Sprinkling Abrasive Grains to the Core

The elastic abrasive 1 according to the present invention is manufactured by forming an abrasive-grain layer 3 having a masonry structure formed by integrally forming multiple abrasive grains 31 in the thickness direction on the surface of each core 2 described above.

In order to form the abrasive-grain layer 3 having the above-described masonry structure on the surface of each core 2 as described above, after the abrasive grains 31 are sprinkled to cover or meagerly coat (hereinafter simply referred to as "sprinkled") the surface of the core 2, a pressing force is applied to the core 2 to fix the abrasive grains 31 on the surface of the core, and then the work of fixation by sprinkling and pressing the abrasive grains is repeated.

Here, by uniformly sprinkling the abrasive grains 31 on the surface of the core 2 (see FIG. 2(A)), the core 2 appears to have its entire surface covered by the abrasive grains 31.

However, when a pressing force is applied to the core 2 with the abrasive grains 31 sprinkled as described above, the abrasive grains 31 sprinkled to the surface of the core 2 are pressed inward of the core 2, whereas the core 2 is pushed into and widens the gaps between the abrasive grains 31 and swells out (protrudes) (see FIG. 2(B)).

Thus, in the case where an elastic abrasive manufactured by simply sprinkling (covering) the abrasive grains 31 on the surface of the core 2 is used, foreign matter becomes contacted to the protruding core 2, or portions of the elastic abrasive are clamped to each other and agglomerated.

In contrast, in the elastic abrasive according to this application, after fixing the abrasive grains 31 (see FIG. 2(B)), the abrasive grains 31 are further sprinkled to the surface of the core 2 (see FIG. 2(C)), a pressing force is applied to the core 2 with the abrasive grains 31 sprinkled again as described above to fix the abrasive grains 31 (FIG. 2(D)), and by repeating this work, the abrasive-grain layer 3 having a thickness W, for example, about four or more times larger than the average grain diameter of the abrasive grains used is formed.

Through a repetition of fixation by sprinkling the abrasive grains 31 and applying a pressing force, the abrasive-grain layer 3 having a masonry structure is formed on the surface of the core 2, as shown in an enlarged view in FIG. 1. As a result, even in the case where an elastomer that is soft and highly deformable is used as the core 2, the core 2 is prohibited from swelling out to the surface beyond the abrasive-grain layer 3 in ordinary usage or storage. Accordingly, foreign matter does not contact to the surface of the resulting elastic abrasive 1, and mutual clamping and agglomeration of the elastic abrasive 1 are prevented.

When manufacturing the elastic abrasive 1 having the abrasive-grain layers 3 structured as described above, if the amount to be manufactured is relatively small, for example, it is possible to manufacture the elastic abrasive 1 by kneading a mixture of the cores 2 and the abrasive grains 31 many times by hand or by putting the cores 2 and the abrasive grains 31 together in a mortar and pressing or striking the mixture many times with a pestle. However, it is possible to manufacture a large amount of the elastic abrasive 1 relatively easily, for example, by putting mixing media such as ceramic balls, steel balls, or, as in this embodiment, alumina balls, in the drum of a mixer together with a mixture of the cores 2 and the abrasive grain 31 and rotating the drum.

The formation of the abrasive-grain layers 3 should preferably be continued until the thickness W of the abrasive-grain layers 3 becomes about four or more times larger than the average grain diameter of the abrasive grains used as described earlier. If the thickness W of the abrasive-grain layers 3 is less than four times the average grain diameter of the abrasive grains used, there are cases where the cores become exposed at the surface beyond the abrasive-grain layers, which causes contact of foreign matter to the elastic abrasive 1 or mutual clamping and agglomeration of the elastic abrasive 1.

On the other hand, as the thickness W of the abrasive-grain layers 3 increases, the elastic abrasive 1 loses its elasticity and becomes harder. When the thickness W of the abrasive-grain layers 3 becomes ¼ (25%) of the short diameter d of the cores, the elasticity is reduced to about ⅛ of the elasticity of the cores 2. Thus, the abrasive-grain layer 3 should preferably be formed such that the thickness of the abrasive-grain layers 3 falls in the range less than ¼ (25%) of the short diameter d of the cores 2.

After forming the abrasive-grain layers 3 by repeatedly sprinkling the abrasive grains 31 to the surface of the cores 2 and applying a pressing force as described above, it is possible to manufacture the elastic abrasive 1 according to the present invention by removing excess abrasive grains by sifting, etc., and classifying the resulting elastic abrasive 1 itself as needed on the basis of grain diameters.

4. Using Method

The elastic abrasive 1 manufactured as described above can be used for mirror-surface polishing treatment of a workpiece by propelling it to make it collide with the surface of the workpiece by a method known as "sand blasting" or "shot blasting."

The elastic abrasive 1 may be propelled by any method with which it is possible to propel the abrasive onto the surface of a workpiece at a predetermined ejection speed or ejection angle, such as an air-based method in which the abrasive is ejected together with compressed gas, a centrifugal (impeller) method in which the abrasive is propelled by utilizing the centrifugal force of a rotating impeller, or a stamping method in which the abrasive is propelled by throwing it by means of a stamping rotor.

Among these methods, the air-based method makes it possible to make the elastic abrasive 1 ejected from a nozzle collide with a desired part of the workpiece. This facilitates treatment even if the workpiece is large and heavy. Also, it is possible to readily adjust the flying speed of the elastic abrasive 1 or the energy at the time of collision by adjusting the ejection pressure of the compressed gas ejected together with the elastic abrasive 1, etc. Thus, it is preferable to use an air-based blasting machine for propelling the elastic abrasive 1. As such an air-based blasting machine, one in which a compressor or a blower is used as a source of compressed gas (compressed air) may be used.

The elastic abrasive 1 is propelled under such condition that the elastic abrasive 1 having collided with the surface of the workpiece can slide along the surface of the workpiece. Among the blasting methods described above, with the method in which the abrasive is ejected together with compressed air, regardless of the ejection angle relative to the surface of the workpiece, the compressed gas ejected together with the elastic abrasive flows along the surface of the workpiece after impinging on the surface of the workpiece, so that the elastic abrasive 1 can also be made to slide on the surface of the workpiece, following the flow. Accordingly, it is possible to make the elastic abrasive 1 slide on the surface of the workpiece in the case where the elastic abrasive 1 is propelled in the entire range of incident angles of 0 to 90° relative to the surface of the workpiece.

However, also considering the centrifugal method and the stamping method, the suitable range of incident angles is 5 to 70°, preferably 10 to 60°, and more preferably 10 to 45°.

The ejection pressure (treatment pressure) in an air-based blasting machine may be changed as appropriate depending on the material of the workpiece, the grain diameter of the elastic abrasive used, the material of the abrasive grains used, the target condition to be achieved by treatment, etc., for example, in a range of 0.01 to 0.5 MPa, and the preferred range of the ejection pressure is 0.02 to 0.3 MPa.

If the ejection pressure (treatment pressure) is less than 0.01 MPa, the speed of collision of the elastic abrasive 1 with the workpiece is low (and thus the energy of collision is also small). Thus, although treatment itself is possible, it takes a long time to achieve a desired finish of the surface, which is not economical. On the other hand, if the ejection pressure is 0.5 MPa or higher, when the elastic abrasive 1 collides with the workpiece, the abrasive grains 31 easily detach from the abrasive-grain layers 3 of the elastic abrasive 1. This shortens the life of the elastic abrasive 1, requiring restoration at a relatively early timing.

By propelling the above-described elastic abrasive 1 according to the present invention onto the surface of the workpiece under the condition described above, whereby the elastic abrasive 1 slides along the surface of the work-piece, the elastic abrasive 1 can be used to achieve, through this sliding, a surface treatment condition corresponding to the material and grain diameter of the abrasive grains 31 constituting the abrasive-grain layers 3, for example, for the purpose of mirror-surface polishing of the workpiece surface.

It should be noted that, although the elastic abrasive 1 according to the present invention is constituted such that the abrasive grains 31 sprinkled to the surface hardly detach, its performance degrades to a nonnegligible extent as a result of detachment of the abrasive grains 31 after repeated use.

In the case where such a performance degradation has occurred, it is possible to restore the performance of the elastic abrasive 1 by repeating the work of sprinkling the abrasive grains 31 to the surface of the used elastic abrasive 1 and applying a pressing force, similarly to the method for manufacturing the elastic abrasive 1 described earlier.

5. Collision Behavior of the Elastic Abrasive 1 According to the Present Invention FIG. 8 shows how the shape of the elastic abrasive 1 according to the present invention changes in the case where the elastic abrasive 1 is ejected onto the surface of a workpiece together with a compressed fluid, during the process in which the elastic abrasive 1 collides with the surface of the work-piece, slides along the surface of the workpiece, and bounces back from the surface of the workpiece.

The shape of the elastic abrasive 1 that is ejected onto the surface of the workpiece is the shape formed at the time of the granulation described earlier. In the case shown in FIG. 8, the shape is substantially spherical with a substantially circular cross-section. In the interior of the cores 2 of the elastic abrasive 1, the linear molecules of the polyrotaxane are romunded and shrunk, so that the entropy is high and the condition is stable.

Figure 8:
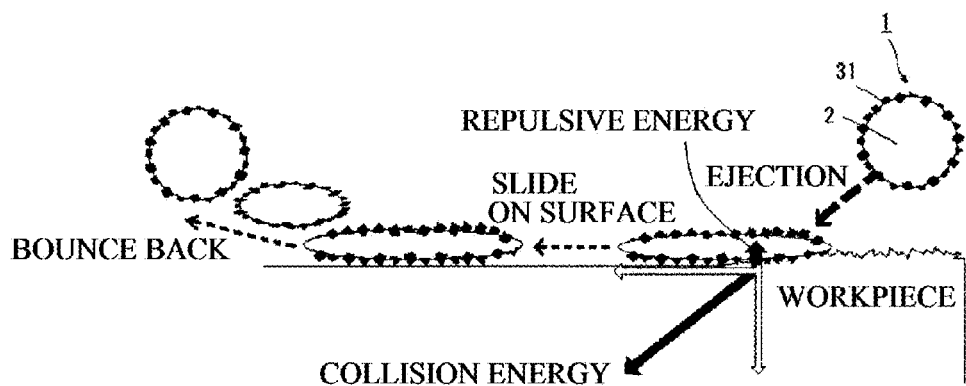
FIG. 8 is a sectional view showing an example of ejection of the elastic abrasive according to the present invention.

Then, the elastic abrasive 1 that has been ejected begins to deform (flatten) when it comes into contact with the surface of the workpiece, and eventually becomes considerably flattened as shown in FIG. 8. During this process, in the interior of the cores 2 of the elastic abrasive 1, due to the energy of repulsion from the surface of the workpiece caused by the collision, the linear molecules of the polyrotaxane which have been rounded are stretched out in the surface direction of the surface, and the cyclic molecules of the polyrotaxane constituting crosslinking points move on the linear molecules and act as pulleys, whereby the stress is distributed.

Furthermore, since the cores 2 easily deform and their rubber hardness (elastic modulus) is low, as described earlier, the elastic abrasive 1 that has come into contact with the surface of the workpiece hardly bounces back. Due to the remaining energy of the elastic abrasive 1 in the surface direction and the compressed fluid that has changed its flow direction after colliding with the workpiece into the direction along the surface of the workpiece, the elastic abrasive 1 slides along the surface of the work-piece to polish the surface of the workpiece.

At this time, the elastic abrasive 1 is flattened considerably by the collision, so that the contact area with the surface, i.e., the polishing area, becomes larger, and the surface is polished along the surface. Furthermore, as described earlier, the impact of the collision is distributed in the interior of the cores 2 by the crosslinked cyclic molecules (crosslinking points) acting like pulleys, and a distributed uniform force is applied to the individual abrasive grains 31 of the elastic abrasive 1. Thus, it is possible to perform mirror-surface polishing such that the surface becomes highly smooth and uniform.

After coming into contact with the surface of the workpiece and being flattened while sliding on the surface, the elastic abrasive 1 then undergoes a process of restoring its original shape while sliding on the surface and eventually bounces back from the surface of the workpiece. At this time, in the interior of the cores 2, from an unstable condition in which the entropy has decreased due to the extension of the linear molecules and the movement of the cyclic molecules caused by the collision, as described above, the internal molecules of the cores 2 make a spontaneous change in the direction of increasing entropy. i.e., in the direction of restoring the stable condition before the collision, and eventually restore the shape formed at the time of the granulation.

The following describes in detail a decrease in the entropy due to the movement of the cyclic molecules in the interior of the cores 2 described above. First, the polyrotaxane molecules in the polyrotaxane compound constituting the core 2 include both cyclic molecules that have reacted with the crosslinking agent and thus have been crosslinked (crosslinking points) and cyclic molecules that have not reacted with the crosslinking agent and thus have not been crosslinked. Among the polyrotaxane molecules, the linear molecules can freely pass through the crosslinked cyclic molecules, whereas the uncrosslinked cyclic molecules cannot pass through the crosslinked cyclic molecules. Thus, in the interior of the cores 2, in the process of stretching out the linear molecules of the polyrotaxane caused by the collision, the crosslinked cyclic molecules are pulled and move on the linear molecules, and in some parts, two crosslinked cyclic molecules move so as to contract some uncrosslinked cyclic molecules held therebetween, which results in an increased density of cyclic molecules. This results in a non-uniform distribution of the cyclic molecules, which results in a decrease in the entropy.

That is, in the interior of the cores 2 of the elastic abrasive 1 that has been flattened after the collision, in addition to what is called rubber elasticity, with which the extended linear molecules restore their original rounded and shrunken shapes, a resilient force of the above-described contracted cyclic molecules trying to restore their original shapes also acts. Accordingly, although the elastic abrasive 1 according to the present invention has a low elastic modulus, the elastic abrasive 1 exhibits superior restoration performance compared with ordinary rubber.

In the elastic abrasive 1 according to the present invention, even after the above-described series of processes caused by the collision, the abrasive grains 31 are maintained owing to the use of the polyrotaxane compound having autohesion properties for the cores 2, as described earlier.

EXAMPLES

Next, examples of preparation of the elastic abrasive according to the present invention and examples of treatment using the resulting elastic abrasives will be described.

1. Examples of Preparation of the Elastic Abrasive 1-1. Examples of Preparation of the Cores Cores prepared by granulating crosslinked polyrotaxane compounds prepared by the methods described below were used.

(1) Preparation of Polyrotaxanes
(1-1) Polyrotaxane A $\epsilon$-caprolactone (78 mass %) was introduced while slowly supplying a flow of nitrogen in a "hydroxypropylated polyrotaxane compound" (17 mass %) prepared by using polyethylene glycol (weight-average molecular weight of 35,000) as linear molecules, $\alpha$-cyclodextrin as cyclic molecules, and adamantanamine groups as blocking groups and by hydroxypropylating some of the OH groups of the $\alpha$-cyclodextrin, and the resulting mixture was stirred uniformly at 100° C. for 60 minutes. Then, 2-ethylhexanoic acid tin diluted with toluene (50 mass % solution: 5 mass %) was added to cause a reaction, and the solvent was removed, whereby a "caprolactone-introduced hydroxypropylated polyrotaxane compound" was prepared. This "caprolactone-introduced hydroxypropylated polyrotaxane compound" was referred to as "polyrotaxane A."

(1-2) Polyrotaxane B

By using polyethylene glycol (mass-average molecular weight of 35,000) as linear molecules, $\alpha$-cyclodextrin in which hydroxypropyl groups were introduced and in which $\epsilon$-caprolactone was graft-polymerized (degree of hydroxypropyl substitution: 48%, amount of $\epsilon$-caprolactone introduced for polymerization: [$\epsilon$-caprolactone]/[hydroxyl groups]=3.9, amount of inclusion of cyclic molecules: 25%) as cyclic molecules, and adamantane groups as blocking groups, a polyrotaxane was prepared similarly to the method described in Soft Matter, 2008, 4, 245-249, which was referred to as "polyrotaxane B."

(1-3) Polyrotaxane C 10 g of polyethylene glycol (average molecular weight: 35,000), 100 mg of 2,2,6,6-tetramethyl-1-piperidinyloxy radical (TEMPO), and 1 g of sodium bromide were dissolved in 100 ml of water. 5 ml of a commercially available aqueous solution of sodium hypochlorite (effective chlorine concentration of about 5%) was added to the resulting solution to cause a reaction while stirring the mixture at room temperature. At this time, 1N NaOH was added in order to maintain a pH of 10 to 11. Then, ethanol was added to stop reaction.

Extraction from the solution prepared through the reaction was repeated three times by using 50 ml of methylene chloride to extract components other than inorganic salts, and the methylene chloride was removed by using an evaporator. The extracted components were dissolved in 250 ml of hot ethanol, the resulting solution was then left overnight at −4° C. to cause precipitation of only PEG-carboxylic acids, and the PEG-carboxylic acids were collected by centrifugation.

3 g of the PEG-carboxylic acids described above serving as linear molecules, and 12 g of α-cyclodextrin serving as cyclic molecules were dissolved individually in separately prepared 50 ml of hot water at 70° C., the resulting solutions were mixed together, and the resulting mixture was then left overnight at 4° C., whereby an inclusion complex of the linear molecules and the cyclic molecules was prepared.

0.13 g of adamantanamine (manufactured by Aldrich) was dissolved in 50 ml of dimethylformamide (DMF) at room temperature, the resulting solution was added to 14 g of the inclusion complex prepared as described above, and the resulting mixture was immediately shaken and mixed sufficiently. Then, a solution prepared by dissolving 0.38 g of a BOP reagent (benzotriazol-1-yl-oxy-tris (dimethylamino)-phosphonium hexafluorophosphate) in 25 ml of DMF was added, and the resulting mixture was similarly shaken and mixed sufficiently. Furthermore, a solution prepared by dissolving 0.14 ml of diisopropylethylamine in 25 ml of DMF was added, and the resulting mixture was similarly shaken and mixed sufficiently. The resulting mixture was left overnight in a refrigerator.

Then, 100 ml of a mixed solution of DMhF/methanol=1:1 was added to the above mixture, the resulting mixture was mixed sufficiently and was subjected to centrifugation, and the supernatant was discarded. After repeating this cleaning with the DMF/methanol mixed solution two times, cleaning with 100 ml of methanol was repeated two times similarly by centrifugation. The resulting precipitate was dried in vacuum, and the dried precipitate was dissolved in 50 ml of dimethyl sulfoxide (DMSO). The resulting transparent solution was added dropwise to 700 ml of water to cause precipitation of a polyrotaxane in which blocking groups were bonded at either end of each linear molecule penetrating through the holes of multiple cyclic molecules (cyclic molecules: α-cyclodextrin; linear molecules: PEG; blocking groups: adamantane groups). The polyrotaxane precipitate was collected by centrifugation and was vacuum dried or freeze dried. This cycle of dissolution in DMSO, precipitation in water, collection, and drying was repeated two times to finally obtain a refined polyrotaxane. The resulting polyrotaxane was referred to as "polyrotaxane C."

(1-4) Polyrotaxane D

The hydroxyl groups of the α-cyclodextrin in "polyrotaxane C" were acetylated with acetic anhydride under the presence of dimethylaminopyridine (catalyst) in a dimethylacetamide/lithium chloride solvent, and the resulting polyrotaxane was referred to as "polyrotaxane D."

(1-5) Polyrotaxane E

The hydroxyl group at one terminal of polyethylene glycol 600 (manufactured by Aldrich, Mn: 600) was reacted with tosyl chloride and was thereby tosylated under the presence of pyridine (catalyst) in methylene chloride. Meanwhile, the hydroxyl groups of the cyclodextrin in "polyrotaxane C" were activated with sodium hydride in dimethylformamide to cause a reaction with the tosylated polyethylene glycol, thereby forming ether bonds to add long oxyethylene chains to the hydroxyl groups of the cyclodextrin. The resulting polyrotaxane was referred to as "polyrotaxane E."

(2) Preparation of Polyrotaxane Compounds (2-1) Polyrotaxane Compound A

Polyrotaxane A described above (29.35 mass %), a crosslinking agent (41.92 mass %), polycarbonate diol ("DURANOL T5650J") manufactured by Asahi Kasei Chemicals) (26.80 mass %), dibutyltin dilaurate (0.01 mass %), and 2,4-bis(dodecylthiomethyl)-6-methylphenol ("IRGANOPX 1726" manufactured by BASF) (1.92 mass %) were put into a reaction vessel, the temperature was raised to 80° C., the mixture was stirred to become uniform, the mixture was then subjected to vacuum degasification, and the resulting polyrotaxane compound was referred to as "polyrotaxane compound A."

The crosslinking agent used here can be prepared by the following method.

1,3-bis(isocyanatomethyl)cyclohexane ("TAKENATE 600" manufactured by Mitsui Chemicals) is put into a nitrogen-purged reaction vessel, and the temperature is raised to 80° C. while stirring the content.

64 mass % of polycarbonate diol ("DURANOL T-5650J" manufactured by Asahi Kasei Chemicals) heated to 70° C. is slowly added dropwise to 36 mass % of the 1,3-bis(isocyanatomethyl)cyclohexane over a period of 4 hours, and the mixture is further stirred for 3 hours while maintaining the temperature, whereby a compound is prepared.

The compound prepared by the method described above is put into a nitrogen-purged reaction vessel, the temperature is raised to 100° C. while stirring the content, 21 mass % of ε-caprolactam is added to 79 mass % of the compound, the mixture is stirred for 6 hours, and the resulting product is used as the crosslinking agent described above.

(2-2) Polyrotaxane Compound B

Polyrotaxane A described above (16.25 mass %), a crosslinking agent (45.03 mass %), polycarbonate diol ("DURANOL T5650E" manufactured by Asahi Kasei Chemicals) (37.71 mass %), dibutyltin dilaurate (0.03 mass %), and 2,4-bis(dodecylthiomethyl)-6-methylphenol ("IRGANOX 1726" manufactured by BASF) (0.98 mass %) were put into a reaction vessel, the temperature was raised to 80° C., the mixture was stirred to prepare a uniform solution, the solution was then subjected to vacuum degasification, and the resulting polyrotaxane compound was referred to as "polyrotaxane compound B."

The crosslinking agent used here can be prepared by the following method.

1,3-bis(isocyanatomethyl)cyclohexane ("TAKENATE 600" manufactured by Mitsui Chemicals) is put into a nitrogen-purged reaction vessel, and the temperature is raised to 80° C. while stirring the content.

53 mass % of polycarbonate diol ("DURANOL T-5650E" manufactured by Asahi Kasei Chemicals) heated to 70° C. is slowly added dropwise to 47 mass % of the 1,3-bis(isocyanatomethyl)cyclohexane in the reaction vessel over a period of 2 hours, and the mixture is further stirred for 3 hours while maintaining the temperature, whereby a compound is prepared.

The above compound is put into a nitrogen-purged reaction vessel, the temperature is raised to 100° C. while stirring the content, 24 mass % of ε-caprolactam is added to 76 mass % of the compound, the mixture is stirred for 6 hours, and the resulting product is used as the crosslinking agent described above.

(2-3) Polyrotaxane Compound C

The polyrotaxane B described above (6 parts by mass), an acrylic acid ester copolymer (100 parts by mass), a crosslinking agent (4 parts by mass), and β-glycidoxypropyltrimethoxysilane (KBM403 manufactured by Shin-Etsu Chemical) (0.2 parts by mass) were mixed, and the resulting polyrotaxane compound was referred to as "polyrotaxane compound C."

The acrylic acid ester copolymer described above was an acrylic acid ester copolymer having a mass-average molecular weight of 1,800,000 and composed of 98.5 mass % of butyl acrylate units and 1.5 mass % of 2-hydroxyethyl acrylate units.

Furthermore, the crosslinking agent used here was a trimethylolpropane adduct of xylylene diisocyanate (TD-75 manufactured by Soken Chemical Engineering; functionality 3, molecular weight 698, solid content 75 mass %).

By including a silane coupling agent in polyrotaxane compound C, it is possible to improve the adhesion with abrasive grains composed of inorganic materials, such as glass, quartz, and metals.

(2-4) Polyrotaxane Compound D 20 parts by mass of "polyrotaxane C" described above and 100 parts by mass (in terms of solid content) of a polyacrylic acid ester copolymer (I) were mixed, and the resulting polyrotaxane compound was referred to as "polyrotaxane compound D."

The above polyacrylic acid ester copolymer (I) was a polyacrylic acid ester copolymer having a mass-average molecular weight of 410.000 and prepared by mixing 90 parts by mass of n-butyl acrylate. 10 parts by mass of 2-isocyanatoethyl methacrylate, and 0.6 parts by mass of azobisisobutyronitrile serving as a polymerization initiator in 200 parts by mass of ethyl acetate and by stirring the mixture at 60° C. for 17 hours.

(2-5) Polyrotaxane Compound E 20 parts by mass of polyrotaxane D and 100 parts by mass (in terms of solid content) of the polyacrylic acid ester copolymer (I) described above were mixed, and the resulting polyrotaxane compound was referred to as "polyrotaxane compound E."

As opposed to polyrotaxane compound A, polyrotaxane compound B, and polyrotaxane compound C using the crosslinking agents described above, in which the cyclic molecules of the polyrotaxanes and the polyacrylic acid ester copolymers were bonded (crosslinked) with each other both directly and indirectly via the crosslinking agents, in polyrotaxane compound D and polyrotaxane compound E described above, the cyclic molecules of the polyrotaxanes and the polyacrylic acid ester copolymers were bonded with each other only directly (the polyacrylic acid ester copolymers were crosslinked by the polyrotaxanes).

(2-6) Polyrotaxane Compound F 20 parts by mass of polyrotaxane E and 100 parts by mass (in terms of solid content) of the polyacrylic acid ester copolymer (I) described above were mixed, and the resulting polyrotaxane compound was referred to as "polyrotaxane compound F."

As opposed to polyrotaxane compound A, polyrotaxane compound B, and polyrotaxane compound C using the crosslinking agents described above, in which the cyclic molecules of the polyrotaxanes and polycarbonate diol or the acrylic acid ester copolymers were bonded (crosslinked) with each other both directly and indirectly via the crosslinking agents, in polyrotaxane compound F, the cyclic molecules of the polyrotaxane and the polyacrylic acid ester copolymer were bonded with each other only directly (the polyacrylic acid ester copolymer was crosslinked by the polyrotaxane).

(2-7) Polyrotaxane Compound G 20 parts by mass of polyrotaxane C, 100 parts by mass (in terms of solid content) of a polyacrylic acid ester copolymer (11), and 10 parts by mass (in terms of solid content) of a xylylene diisocyanate-based trifunctional adduct (TD-75 manufactured by Soken Chemical Engineering) serving as a crosslinking agent were mixed, and the resulting polyrotaxane compound was referred to as "polyrotaxane compound G."

The above polyacrylic acid ester copolymer (II) was a polyacrylic acid ester copolymer having a mass-average molecular weight of 800,000 and prepared by mixing 80 parts by mass of n-butyl acrylate, 20 parts by mass of 2-hydroxyethyl acrylate, and 0.4 parts by mass of azobisisobutyronitrile serving as a polymerization initiator in a mixed solvent including 300 parts by mass of ethyl acetate and 100 parts by mass of methyl ethyl ketone and by stirring the mixture at 60° C. for 17 hours.

(2-8) Polyrotaxane Compound H 30 parts by mass of polyrotaxane C, 100 parts by mass (in terms of solid content) of the polyacrylic acid ester copolymer (II) described above, and 15 parts by mass (in terms of solid content) of a xylylene diisocyanate-based trifunctional adduct (TD-75 manufactured by Soken Chemical Engineering) serving as a crosslinking agent were mixed, and the resulting polyrotaxane compound was referred to as "polyrotaxane compound H."

(2-9) Polyrotaxane Compound I 5 parts by mass of polyrotaxane D, 100 parts by mass (in terms of solid content) of the polyacrylic acid ester copolymer (II), and 2.5 parts by mass (in terms of solid content) of a xylylene diisocyanate-based trifunctional adduct (TD-75 manufactured by Soken Chemical Engineering) serving as a crosslinking agent were mixed, and the resulting polyrotaxane compound was referred to as "polyrotaxane compound I."

(2-10) Polyrotaxane Compound J 20 parts by mass of polyrotaxane D, 100 parts by mass (in terms of solid content) of the polyacrylic acid ester copolymer (II), and 10 parts by mass (in terms of solid content) of a xylylene diisocyanate-based trifunctional adduct (TD-75 manufactured by Soken Chemical Engineering) serving as a crosslinking agent were mixed, and the resulting polyrotaxane compound was referred to as "polyrotaxane compound J."

(2-11) Polyrotaxane Compound K 20 parts by mass of polyrotaxane E, 100 parts by mass (in terms of solid content) of the polyacrylic acid ester copolymer (II), and 10 parts by mass (in terms of solid content) of a xylylene diisocyanate-based trifunctional adduct (TD-75 manufactured by Soken Chemical Engineering) serving as a crosslinking agent were mixed, and the resulting polyrotaxane compound was referred to as "polyrotaxane compound K."

(3) Crosslinking (Preparation of Elastic Bodies)

The polyrotaxane compounds A and B described earlier are both in liquid states with viscosity when uncrosslinked. It is possible to prepare elastic bodies by heating these polyrotaxane compounds A and B to crosslink α-cyclodextrins with each other.

In this embodiment, the following three kinds of elastic bodies A to C were prepared by using the polyrotaxane compounds A and B (uncrosslinked) described earlier.

As the components of the elastic bodies A to C, less than 1.0 mass % of an antistatic agent may be added in addition to the polyrotaxane compounds A and B described earlier. By adding such an antistatic agent, it is possible to prevent the occurrence of static electricity due to collision with a workpiece or contact with a hose, nozzle, etc. for feeding the abrasive.

(3-1) Elastic Body a

Elastic body A was prepared by putting 500 g of polyrotaxane compound A described earlier in a vessel, maintaining the temperature at 150° C. for 5 hours in a thermostat to achieve crosslinking, taking out the vessel from the thermostat, and allowing heat to dissipate naturally.

(3-2) Elastic Body B

Elastic body B was prepared by putting 500 g of polyrotaxane compound B described earlier in a vessel, maintaining the temperature at 150 (C for 5 hours in a thermostat to achieve crosslinking, taking out the vessel from the thermostat, and allowing heat to dissipate naturally.

(3-3) Elastic Body C

Elastic body C was prepared by putting both 150 g of polyrotaxane compound A and 350 g of polyrotaxane compound B in a common vessel, stirring and mixing the content to form a uniform mixture of these compounds, putting the vessel in a thermostat, maintaining the temperature at 150° C. for 5 hours to achieve crosslinking, taking out the vessel from the thermostat, and allowing heat to dissipate naturally.

(4) Granulation

The elastic bodies A to C prepared as described above were individually cut by using a knife to prepare grains of 0.05 to 3.0 mm on each side. The grains of the elastic bodies A to C prepared as described above were used as cores A to C, respectively.

Table 1 below shows the mechanical properties of the cores A to C prepared as described above.

Each of the cores A to C used in the examples has autohesion properties, and also has the following mechanical properties: a rubber hardness of 30 or less, a compression set of 5% or less, and vibration absorbing properties (tan 5) at 1 Hz to 100 kHz of 0.3 or more, as is apparent from Table 1.

Regarding the rubber hardness, in the case where the polycarbonate diol used in the cores A to C in this embodiment is crosslinked alone without using polyrotaxanes, specifically, when the hydroxyl groups of the polycarbonate diol are isocyanated and are then crosslinked by using a crosslinking agent to form an elastomer (polyurethane), the rubber hardness exceeds 30.

However, by combining (crosslinking) the polycarbonate diol with a polyrotaxane, specifically, by bonding the polycarbonate diol with the cyclic molecules of a polyrotaxane via a crosslinking agent, it becomes possible for the polycarbonate diol to freely move on the linear molecules of the polyrotaxane via the cyclic molecules. That is, the crosslinking points become movable. Accordingly, the flexibility is increased compared with the above-described case where the polycarbonate diol is crosslinked alone. This is the presumable reason that the value of rubber hardness was 30 or less.

Regarding the above-described reaction (crosslinking) mechanism between polycarbonate diol and polyrotaxane, more specifically, of the two functional groups of the crosslinking agent (the polycarbonate diol having isocyanated hydroxyl groups on either end), one reacts and bonds with a functional group of the polycarbonate diol, and the other reacts and bonds with a functional group of a cyclic molecule.

Furthermore, as well as the polycarbonate diol described above, an acrylic acid ester copolymer is an example of a compound that combines (crosslinks) with a polyrotaxane, as described above.

Regarding the mechanism of reaction (crosslinking) between an acrylic acid ester copolymer and a polyrotaxane, of the two functional groups of the crosslinking agent, one reacts and bonds with a functional group of the acrylic acid ester copolymer, and the other reacts and bonds with a functional group of a cyclic molecule of the polyrotaxane, or a functional group of the acrylic acid ester copolymer and a functional group of a cyclic molecule of the polyrotaxane directly react and bond with each other. Thus, similarly to the above-described case of polycarbonate diol, it becomes possible for the acrylic acid ester copolymer crosslinked with the polyrotaxane to move freely on the linear molecules of the polyrotaxane via the cyclic molecules. That is, the crosslinking points become movable.

TABLE 1

Descriptive Features of Crosslinked Polyrotaxane Compounds 1 to 3

|  | Core A | Core B | Core C |
|---|---|---|---|
| Rubber Hardness | 0 | 30 | 20 |
| Compression Set | 0.7 | 0.5 | 0.6 |
| tan δ for 1 Hz to 100 kHz | 0.4 or more | 0.3 or more | 0.3 or more |

1-2. Abrasive Grains

The following three kinds of abrasive grains A to C were prepared as abrasive grains that are sprinkled to the cores.

(1) Abrasive Grains A

Only diamond abrasive grains [#10000 (D50: 0.6 μm)].

(2) Abrasive Grains B

A mixture of 70 mass % of diamond abrasive grains [#10000 (D50: 0.6 μm)] and 30 mass % of green carborundum SiC abrasive grains [#10000 (D50: 0.6 μm)].

(3) Abrasive Grains C

Only green carborundum SiC abrasive grains [#8000 (D50: 1.2 μm)].

1-3. Formation of an Abrasive-Grain Layer on a Core

A combination of one kind of the cores A to C prepared by the methods described earlier and one kind of the abrasive grains A to C described earlier was put together into a mortar, and attachment and pressing of the abrasive grains onto the surface of the cores were repeated by striking the content by means of a pestle while covering the abrasive grains on the surface of the cores in the mortar.

In the examples, in order to determine an appropriate thickness W of abrasive-grain layers that were to be formed on the surface of the cores, the thickness of abrasive-grain layers formed on the surface of the cores was varied by forming abrasive-grain layers by just sprinkling the abrasive grains on the surface of the cores (just covering the abrasive grains without performing the work of striking the abrasive grains by means of a pestle) and by varying the number of repeated attachment and pressing steps.

After forming abrasive-grain layers on the surfaces of the individual cores in this manner, the resulting products were filtered to remove excess abrasive grains and were classified into predefined grain diameter ranges.

1-4. Results

Of the elastic abrasives manufactured as described above, in the case of an elastic abrasive manufactured by just sprinkling (covering) abrasive grains on the surface of cores without performing the work of pressing the cores for the purpose of fixation, although it appeared as if the abrasive grains were sprinkled uniformly on the surface of the cores, when such elastic abrasives were put into a vessel and stored together in bulk, the elastic abrasives clamped to each other and agglomerated, becoming unusable.

Thus, of the elastic abrasives manufactured by repeating attachment and fixation of abrasive grains by using the abrasive grains A, the elastic abrasives that did not agglomerate were cut, and the thicknesses of the abrasive-grain layers that appeared in the cross-sections were observed. As a result, in the elastic abrasives that did not experience such attachment, the thicknesses W of the abrasive-grain layers formed were 2.5 μm or more.

Here, considering that the average grain diameter of the abrasive grains A used in the examples was 0.6 μm, it is presumed from the above results that it is possible to reliably contain the cores 2 within the abrasive-grain layers 3 by forming the abrasive-grain layers such that they have a thickness of about four times the average grain diameter of the abrasive grains used.

Figure 3:
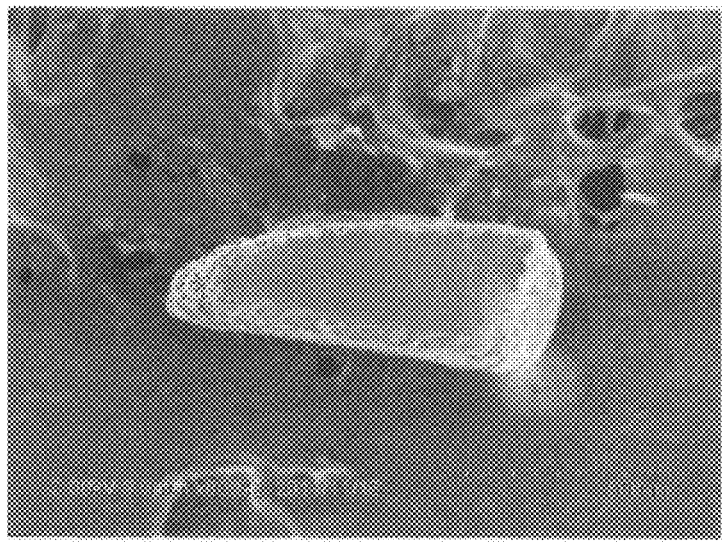
FIG. 3 shows pictures of the elastic abrasive according to the present invention (Example 1) manufactured by means of cross-sectional electron microscopy, where (A) is enlarged by 80 times and (B) is enlarged by 2000 times.
Figure 3:

FIGS. 3 (A) and (B) show pictures, taken by cross-sectional electron microscopy, of the elastic abrasive according to the present invention (combination of the cores A and the abrasive grains A) manufactured by the method described earlier.

From FIGS. 3 (A) and (B) (particularly FIG. 3(B)), it is presumed that abrasive-grain layers each having a masonry structure formed by sprinkling a large number of abrasive grains so as to lie on top of one another on the surface of a core were formed in the elastic abrasive according to the present invention, and the masonry structure of each abrasive-grain layer prevented the core from swelling out to the surface beyond the abrasive-grain layer, succeeding in reliably containing the core within the abrasive-grain layer.

Figure 2:
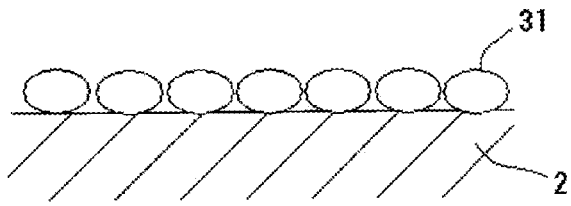
FIG. 2 shows illustrations for explaining the principles of formation of an abrasive-grain layer.
Figure 2:
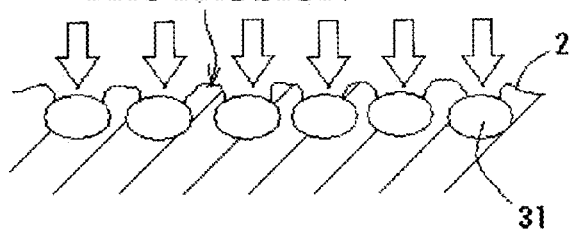
Figure 2:
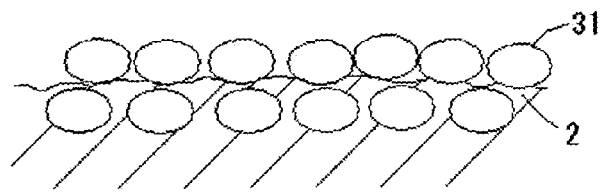
Figure 2:
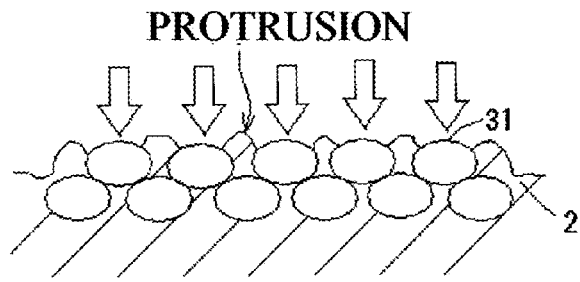

That is, in the state where abrasive grains were simply sparkled (covered) uniformly on the surfaces of the cores, when a pressing force was applied to the surface, the cores protruded from the gaps between the abrasive grains and swelled out to the surface (see FIG. 2(B)), as described with reference to FIG. 2. By repeating attachment and pressing of abrasive grains on the surface of the cores as described earlier, abrasive grains were further sprinkled to the cores protruding from the gaps between the abrasive grains. By forming masonry structures of abrasive grains through a repetition of this work, gaps that allowed protrusion of the cores were completely eliminated, which prohibited the cores from swelling out to the surface beyond the abrasive-grain layers in normal storage or usage. This is the presumable reason that agglomeration due to mutual clamping of elastic abrasives was prevented.

On the other hand, since the cores that were soft and highly deformable were contained in their original forms within the abrasive-grain layers, high deformability and impact absorption were exhibited. That is, it was possible to realize mutually conflicting properties.

Figure 4:
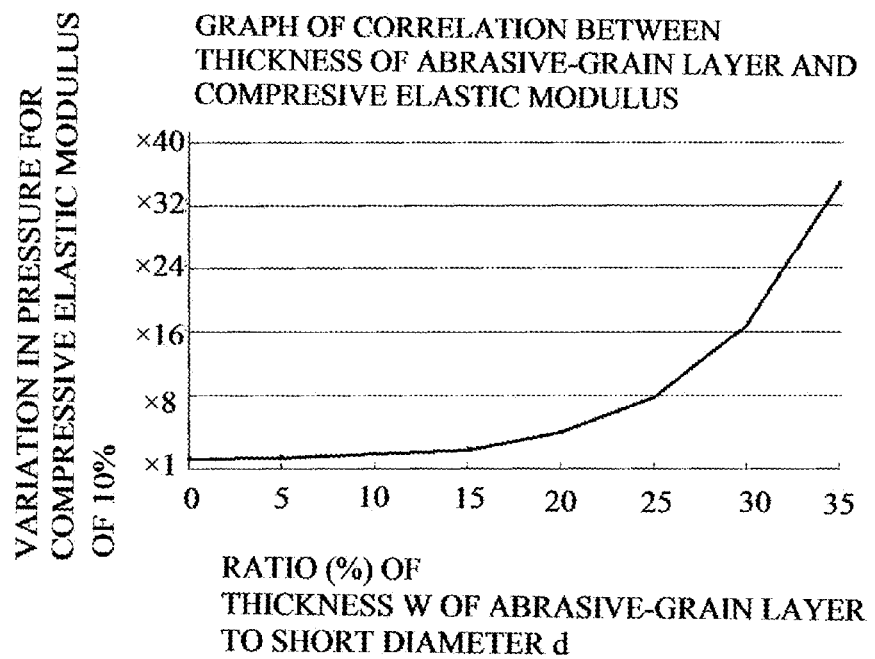
FIG. 4 shows a graph of the correlation between the thickness of the abrasive-grain layer and the compressive elastic modulus in the elastic abrasive according to the present invention.

When attachment and pressing of abrasive grains on the core surfaces are repeated many times, the thickness of the abrasive-grain layers further increases, and the cores and the abrasive grains eventually become uniformly kneaded. However, it was confirmed that the elastic abrasive lost its elasticity as the thickness of the abrasive-grain layers increased, and that regardless of the grain diameter of the elastic abrasive, when the thickness W of the abrasive-grain layers reached ¼ (25%) of the short diameter d (see FIG. 1) of the elastic abrasive, the elasticity was reduced to ⅛ (the pressure needed for a compressive elastic modulus of 10% increased eightfold) compared with the case of the cores alone (see FIG. 4), whereby the deformability and impact absorbing ability of the elastic abrasive became lost.

Thus, the upper limit of the thickness of the abrasive-grain layers that are formed is about ¼ (25%), preferably 1/20, and more preferably about 1/15 of the grain diameter d of the elastic abrasive.

2. Treatment Examples
2-1. Samples (workpieces)

By using samples 1 and 2 described below as workpieces, blasting was performed by using elastic abrasives according to the present invention and an elastic abrasive of a comparative example, and the treatment conditions were compared.
(1) Sample 1

Sample 1 was prepared by propelling abrasive grains of aluminum oxide ("FUJIRUNDUM" WA #400 manufactured by Fuji Manufacturing) by means of a blasting machine onto the mirror-like-finished surface (mirror surface) of a rectangular plate (50×50×2 mm) made of SUS 304 and by roughening the surface.

The surface roughness of sample 1 after the blasting, measured by using a stylus surface roughness measurement device (manufactured by Tokyo Seimitsu Co., Ltd.) was 0.13 μm in terms of arithmetic average roughness (Ra).

(2) Sample 2

Sample 2 was prepared by propelling abrasive grains of aluminum oxide ("FUJIRUNDUM" WA #3000 manufactured by Fuji Manufacturing) by means of a blasting machine onto the mirror-like-polished surface of a rectangular plate (40×40×5 mm) made of a cemented carbide material (tungsten carbide: WC) and by roughening the surface.

The surface roughness of sample 2 after the surface polishing, measured by using a stylus surface roughness measurement device (manufactured by Tokyo Seimitsu Co., Ltd.) was 0.048 μm in terms of Ra.

2-2. Treatment Condition

Table 2 below shows the elastic abrasives used and the treatment condition.

TABLE 2

| | | Treatment Condition | | | |
|---|---|---|---|---|---|
| | | Example 1 | Example 2 | Example 3 | Comparative Example |
| Abrasive | Grain diameter (mm) | 0.3 to 0.8 | 0.1 to 0.3 | 0.3 to 1.5 | 0.3 to 1.5 |
| | Core | Core A | Core B | Core C | Gelatin |
| | Abrasive grain | Abrasive grain A | Abrasive grain B | Abrasive grain C | Abrasive grain A |
| Condition | Ejection Pressure (MPa) | 0.15 | 0.06 | 0.2 | 0.2 |
| | Air source | Compressor | Blower | Compressor | Compressor |
| | Ejection angle (°) | 15 | 60 | 30 | 30 |

The elastic abrasive used in the comparative example was an elastic abrasive having gelatin cores and manufactured by the following method.

350 g of water and 300 g of a mixture of sorbitol and ethylene glycol serving as a moisture evaporation retardant were added to 500 g of powdered gelatin, the resulting mixture was allowed to sufficiently swell at room temperature, the gelatin was fully dissolved by heating, and the solution was cooled at room temperature to achieve gelation.

The gelated gelatin was cut by means of a cutter, and the resulting grains were used as cores. By covering abrasive grains on the surface of the cores, the abrasive grains were sprinkled to the surface of the cores due to the adhesiveness of the gelatin itself, whereby an elastic abrasive was manufactured.

As propelling machines, air-based blasting machines ("SFCSR-1" manufactured by Fuji Manufacturing) were used. The diameters of the tips of the ejection nozzles of the blasting machines were 8 mm.

Two types of blasting machines, individually having a compressor and a blower as a source of compressed air, were used as the above blasting machines. The type of blasting machine used in each example is designated in the "air source" row of Table 2 above.

2-3. Test Method and Test Results 1000 g of the elastic abrasives of Examples 1 to 3 and the Comparative Example was individually introduced into the abrasive tanks of the blasting machines described above. Only the 1000 g of the abrasives that was initially introduced was circulated and used, without adding, replacing, or restoring the elastic abrasives. The elastic abrasives were propelled onto the surfaces of the same samples for 80 hours, and changes in the surface roughness of the samples and changes in the cutting amounts in relation to the treatment periods were measured individually.

The results of the above treatment test show that in the case where the elastic abrasive of the Comparative Example (gelatin cores) was used, although the surfaces of both sample 1 and 2 were polished to achieve mirror-like finishes in the early stage of treatment, after 5 hours from the start of treatment, the surface of sample 1 (SUS 304) became a satin-like surface, and clouding occurred on the surface of sample 2 (WC).

This demonstrates that the life of the abrasive of the Comparative Example is less than 5 hours when the abrasive is used under the above condition and that the initial polishing and cutting ability cannot be maintained when the abrasive is used continuously beyond this life.

Figure 5:
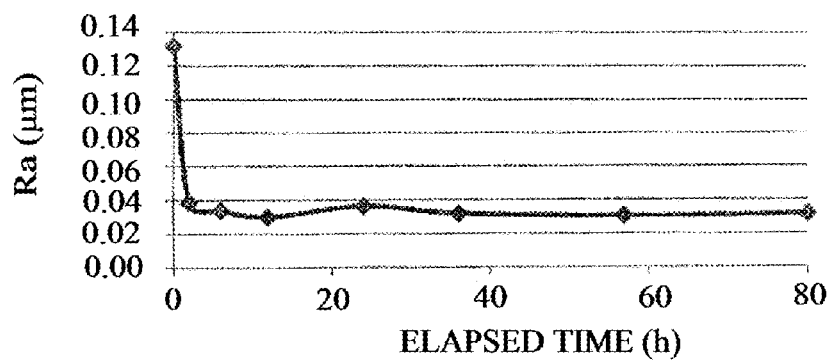
FIG. 5 shows a graph of the correlation between the treatment period and the surface roughness in Example 3 (sample 1: SUS 304)
Figure 6:
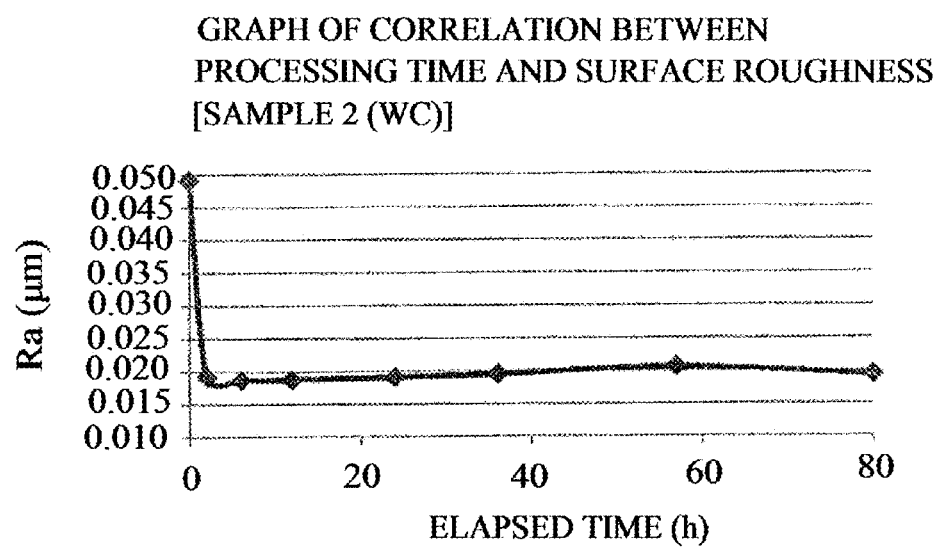
FIG. 6 shows a graph of the correlation between the treatment period and the surface roughness in Example 3 (sample 2: WC)
Figure 7:
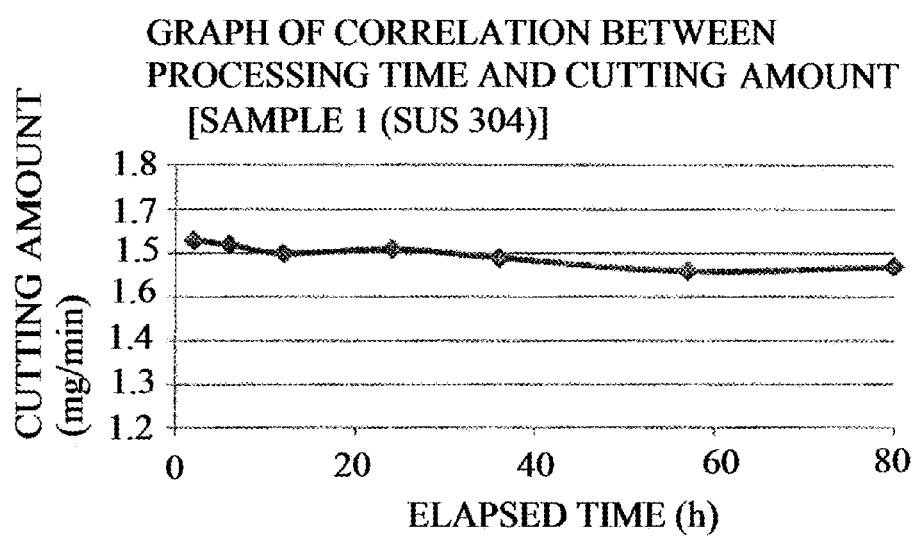
FIG. 7 shows a graph of the correlation between the treatment period and the cutting amount in Example 3 (sample 1: SUS 304)

On the other hand, in the treatment using the elastic abrasives of Examples 1 to 3, in the treatment of both samples 1 and 2, after the surface roughness of the samples decreased and once they reached certain levels of surface roughness (mirror-like surfaces), the surface roughness was maintained for 80 hours (see FIGS. 5 and 6 for Example 3). This demonstrates that when the elastic abrasives of Examples 1 to 3 are used under the above condition, it is possible to maintain a certain level of treatment precision for at least 80 hours; that is, the abrasives have a life exceeding 80 hours.

Although the results for Examples 1 and 2 are not shown, the changes between the surface roughness of samples 1 and 2 after 2 hours from the start of treatment and after 80 hours from the treatment were about 5% for Example 1 and about 2% for Example 2, and the cutting amount after 80 hours from the treatment was reduced only by about 2% compared with the cutting amount after 2 hours from the start of treatment for both Examples 1 and 2. This demonstrates that the abrasives can achieve certain levels of treatment condition and exhibit certain levels of cutting abilities over a long period for both Examples.

With the elastic abrasive used in the Comparative Example, the cores become softened and the abrasive loses its functionality at a temperature of about 40 to 50° C., so that temperature constraints will be imposed when the abrasive is used. On the other hand, with the elastic abrasives of Examples 1 to 3, the performance does not degrade even when the abrasives are heated to about 120° C. at the minimum, so that there are no constraints on the operating temperatures, as opposed to the gelatin-core abrasive of the Comparative Example.

3. Others

As a result of checking the abrasives of Examples 1 to 3 after circulated for 80 hours as described above, it was confirmed that the abrasive-grain layers of the elastic abrasives became less thick after use.

Thus, the elastic abrasives collected after use were again put into a mortar together with abrasive grains, and the work of covering the abrasive grains on the surfaces and striking the contents with a pestle was repeated. Then, the abrasive-grain layers became thicker. This demonstrates that it is possible to restore the elastic abrasives.

DESCRIPTIONS OF REFERENCE NUMERALS—

1. Elastic abrasive
2. Core
3. Abrasive-grain layer
31. Abrasive grain
W. Thickness of abrasive-grain layer
d. Short diameter of elastic abrasive

The invention claimed is:

1. A method for manufacturing an elastic abrasive comprising:
   preparing a core by granulating a crosslinked polyrotaxane compound having a rubber hardness of 30 or less and having autohesion properties so as to have a predetermined grain diameter, and
   after sprinkling abrasive grains having an average grain diameter of 0.1 μm to 12 μm on the surface of the core, applying a pressing force to the surface of the core having the abrasive grains sprinkled thereto to fix the abrasive grains on the surface of the core, and
   forming an abrasive-grain layer having a masonry structure formed by integrally forming multiple abrasive grains in the thickness direction on the surface of the core by repeating similar fixation by sprinkling abrasive grains and applying a pressing force on the surface of the core having the abrasive grains fixed thereon.

2. The method according to claim 1, wherein the core has a compression set of 5% or less and vibration absorbing properties (tan δ) of 0.3 or more at 1 Hz to 100 kHz.

3. The method according to claim 1, wherein the abrasive-grain layer has a thickness less than ¼ of a short diameter of the elastic abrasive.

4. The method according to claim 1, wherein the core has a rubber hardness of 10 or less.

5. The method according to claim 1, wherein the core has a compression set of 1% or less.

6. The method according to claim 1, wherein a mixture of the core and the abrasive grains is put into a drum of a mixer together with a mixing medium, and the drum is rotated to repeatedly sprinkle abrasive grains to the surface of the core and apply a pressing force to the core.

7. An elastic abrasive comprising
   a core prepared by granulating a crosslinked polyrotaxane compound having a rubber hardness of 30 or less and having autohesion properties to have a predetermined grain diameter; and
   an abrasive-grain layer formed on the surface of the core, the abrasive-grain layer having a masonry structure formed by integrally forming multiple abrasive grains having an average grain diameter of 0.1 μm to 12 μm by the crosslinked polyrotaxane compound in the thickness direction.

8. The elastic abrasive according to claim 7, wherein the core has a compression set of 5% or less and vibration absorbing properties (tan δ) of 0.3 or more at 1 Hz to 100 kHz.

9. The elastic abrasive according to claim 7, wherein the abrasive-grain layer has a thickness less than ¼ of a short diameter of the elastic abrasive.

10. The elastic abrasive according to claim 7, wherein the core has a rubber hardness of 10 or less.

11. The elastic abrasive according to claim 7, wherein the core has a compression set of 1% or less.

12. The elastic abrasive according to claim 7, wherein the crosslinked polyrotaxane compound is formed by crosslinking a compound selected from polycarbonate diol and an acrylic acid ester copolymer with a polyrotaxane.

13. The elastic abrasive according to claim 12, wherein the crosslinked polyrotaxane compound is formed by crosslinking using a crosslinking agent composed of an isocyanate compound.

14. The elastic abrasive according to claim 12, wherein the polyrotaxane is formed by penetrating openings of α-cyclodextrin molecules with polyethylene glycol and bonding adamantane groups at either end of the polyethylene glycol.

15. The elastic abrasive according to claim 14, wherein polycaprolactone groups are substituted for a part of the hydroxyl groups of the α-cyclodextrin molecules.

16. The elastic abrasive according to claim 12, wherein a silane coupling agent is mixed with the crosslinked polyrotaxane compound.

17. The blasting method wherein the elastic abrasive according to claim 7, is ejected at an incident angle of 0 to 90° onto a surface of a workpiece together with a compressed fluid.

18. The blasting method according to claim 17, wherein the incident angle is in a range of 5 to 70°.

19. The blasting method according to claim 17, wherein the elastic abrasive is ejected at an ejection pressure of 0.01 to 0.5 MPa.

\* \* \* \* \*

UNITED STATES PATENT AND TRADEMARK OFFICE
CERTIFICATE OF CORRECTION

PATENT NO. : 9,186,775 B2  
APPLICATION NO. : 14/364858  
DATED : November 17, 2015  
INVENTOR(S) : Keiji Mase et al.

Page 1 of 1

It is certified that error appears in the above-identified patent and that said Letters Patent is hereby corrected as shown below:

In The Specification

Column 17, line 24, Please delete "DMhF" and insert --DMF--;

Column 18, line 61, Please delete "β-glycidoxypropyltrimethoxysilane" and insert --3-glycidoxypropyltrimethoxysilane--;

Column 19, line 24, Please delete "410.000" and insert --410,000--;

Column 21, line 26, Please delete "(tan 5)" and insert --(tan δ)--.

Signed and Sealed this  
Fifth Day of April, 2016

Michelle K. Lee  
*Director of the United States Patent and Trademark Office*